United States Patent
Pike, Sr.

(10) Patent No.: US 11,603,332 B2
(45) Date of Patent: Mar. 14, 2023

(54) METHODS FOR COAL COMBUSTION PRODUCT (CCP) RECOVERY AND RELATED PRODUCTS

(71) Applicant: VHSC, LTD., Tortola (VG)

(72) Inventor: Clinton Wesley Pike, Sr., Montgomery, TX (US)

(73) Assignee: ECO MATERIAL TECHNOLOGIES IP INC., South Jordan, UT (US)

(*) Notice: Subject to any disclaimer, the term of this patent is extended or adjusted under 35 U.S.C. 154(b) by 247 days.

(21) Appl. No.: 17/012,141

(22) Filed: Sep. 4, 2020

(65) Prior Publication Data

US 2021/0061709 A1    Mar. 4, 2021

Related U.S. Application Data

(60) Provisional application No. 62/895,608, filed on Sep. 4, 2019.

(51) Int. Cl.

| | |
|---|---|
| *C04B 18/06* | (2006.01) |
| *C01F 11/48* | (2006.01) |
| *C01F 11/46* | (2006.01) |
| *C04B 5/00* | (2006.01) |
| *C04B 28/04* | (2006.01) |
| *C01G 49/12* | (2006.01) |
| *C21B 7/00* | (2006.01) |

(52) U.S. Cl.
CPC ........ *C04B 18/067* (2013.01); *C01F 11/468* (2013.01); *C01F 11/48* (2013.01); *C01G 49/12* (2013.01); *C04B 5/00* (2013.01); *C04B 28/04* (2013.01); *C21B 7/00* (2013.01); *C21B 2400/02* (2018.08)

(58) Field of Classification Search
CPC ....... C04B 5/00; C04B 18/065; C04B 18/067; C04B 28/021; C04B 28/04; C04B 2103/0088; C01F 11/468; C01F 11/48; C21B 3/04; C21B 7/00; C21B 2400/02; C21B 2400/032; Y02W 30/50; Y02W 30/91

See application file for complete search history.

(56) References Cited

U.S. PATENT DOCUMENTS

| | | | |
|---|---|---|---|
| 3,961,973 A | 6/1976 | Jones | |
| 5,511,495 A | 4/1996 | Kinto et al. | |
| 6,637,354 B2 | 10/2003 | Ramme | |
| 2013/0052351 A1* | 2/2013 | Koszo | C04B 35/19 427/314 |

OTHER PUBLICATIONS

Mangi et al., "Performances of concrete containing coal bottom ash with different fineness as a supplementary cementitious material exposed to sweater", Science Direct, Engineering Science and Technology, an International Journal, vol. 22, Issue 3, Jun. 2019, pp. 929-938, 31 pages.

Sasaki, "Effect of grinding on the rate of oxidation of pyrite by oxygen in acid solutions", Science Direct. Geochimica et Cosmochimica Acta, vol. 58, Issue 21, Nov. 1994, pp. 4649-4655, 2 pages.

* cited by examiner

*Primary Examiner* — Anthony J Green
(74) *Attorney, Agent, or Firm* — Hayes Soloway PC

(57) ABSTRACT

Methods of recovering coal combustion products (CCPs) and/or dry bottom furnace slag (DBFS) from coal combustion byproducts are disclosed. The methods include compiling coal combustion byproducts (e.g., from combustion of lignite coal and/or bituminous coal), grinding the coal combustion byproducts to form ground coal combustion byproducts with a maximum particle size of 40 microns, and separating CCPs from the ground coal combustion byproducts using an electrostatic precipitator. The following CCPs can be separated from the coal combustion byproducts using the presently disclosed methods: fly ash, bottom ash (e.g., containing pyrites), scrubber materials (e.g., calcium sulfate and calcium sulfite), and raw coal.

20 Claims, 2 Drawing Sheets

METHODS FOR COAL COMBUSTION PRODUCT (CCP) RECOVERY AND RELATED PRODUCTS

CROSS-REFERENCE TO RELATED APPLICATION

This application claims priority to U.S. Provisional Application Ser. No. 62/895,608, filed on Sep. 4, 2019, the contents of which are hereby incorporated by reference herein.

BACKGROUND

For most, if not all, coal-fired power plants (CFPPs) built from the 1950s through 2015, there are requisite landfills, ash ponds, etc., that were built to store the coal combustion byproducts derived from the burning of coal. These byproducts contain coal combustion products (CCPs) such as fly ash, bottom ash, scrubber residue, and other products formed during the combustion of coal and the subsequent cleaning of the gases from such combustion.

The primary use for the burning of coal is to obtain the "heat" released from its combustion. This heat is then captured (usually in boilers) to convert water to steam, which, when heated enough, will power a turbine to ultimately run a generator and make electricity. Throughout the past 100 years or so, this method produced the base loading for all electric grids in the United States. Many gigawatts of power have been produced via this method and consumed by everyone using electricity. In 2018 alone, the United States generated a record high of 4,178 billion kilowatt-hours (kWh) of electricity, about 63% of which was generated from fossil fuels (coal, natural gas, petroleum, and other gases). The production of this amount of energy also has produced an enormous amount of byproducts and, thus, CCPs. These CCPs have gone through a recycling effort, mainly focusing on using fly ash in several different arenas. However, the products that were produced were insufficient to handle all of the waste CCPs, and large quantities of these CCPs still reside in landfills.

Specifically looking at lignite power stations (and considering all different types of coal being burned), for every ton of lignite burned, some 30-60% of the coal turns to ash (fly ash and/or bottom ash), and scrubbing the gas produces other byproducts that must be processed. At most lignite coal-fired power stations, huge landfills were built to hold many millions of tons of these byproducts and excess gas scrubber products, usually calcium sulfite and other similar compounds, gypsum, and other types of sodium compounds.

In practice, the bottom ash is usually separated from the fly ash by the nature of the coal-fired boiler. The bottom ash usually deposits on the internal structures of the boiler and sheds off the sides of the boiler as the coal is burned and the load on the CFPP unit changes. The bottom ash usually ends up in the bottom of the furnace where it is mixed with water and then transported to a holding tank where it can be dewatered. Then, if the resulting dewatered bottom material is not utilized, it is loaded onto trucks and hauled to a landfill for disposal.

The bottom ash ranges from 3" down to 200 mesh in particle size. Pyrites are often collected from coal pulverizers and combined with the bottom ash during dewatering/disposal. Thus, bottom ash that is generated at coal-burning facilities usually contains pyrite compounds (generally at about 1-3% by weight). To make the bottom ash useable, all pyrites are usually removed, and the resulting material can then be used as some type of aggregate. Removing pyrites from bottom ash is extremely expensive though and, accordingly, bottom ash is not typically used as a lightweight aggregate. Rather, bottom ash from lignite coal is usually disposed of in landfills along with pyrites that are mixed in during dewatering/disposal.

Other compounds generated from CFPPs have been able to be used as aggregate materials. For example, fly ash meeting ASTM C 618 requirements has established industry uses, while the bulk of the other fly ash material has to be disposed of in some manner. Most scrubber materials need to be dewatered to allow for landfill disposal, and the cheapest way to do that was previously to use raw fly ash. Millions of tons of fly ash have been used to dewater calcium sulfite scrubber materials to allow it to be landfilled in accordance with permitting requirements. Many landfills therefore contain a multitude of CCP materials (e.g., fly ash, scrubber materials, such as calcium sulfate and calcium sulfite, bottom ash, pyrites (iron disulfide), raw coal, and other waste products) from power stations.

Some utilities previously separated each of the CCP materials for disposal (i.e., in monofills). However, power stations that burned lignite produced enormous amounts of CCP materials due to the high ash content of the coal (30-50%) and did not separate the waste materials. Recovery of any of the materials from landfills that disposed of waste products from lignite plants will be very costly and inefficient since some of these contaminants will preclude successful use.

SUMMARY

Various methods of recovering coal combustion products (CCPs) and/or dry bottom furnace slag (DBFS) from coal combustion byproducts are described herein. The disclosed methods can, in some embodiments, recover CCPs derived from the combustion of lignite coal and/or bituminous coal by combining coal combustion byproducts, grinding the coal combustion byproducts to form ground coal combustion byproducts with a maximum particle size of 40 microns, and separating CCPs from the ground coal combustion byproducts using an electrostatic precipitator. In some such methods, the coal combustion byproducts can include calcium sulfite, calcium sulfate, and/or pyrites. In these and other embodiments, the methods may also include removing moisture from the coal combustion byproducts to achieve a moisture content of between 5% and 15%.

In some embodiments, separating CCPs from the ground coal combustion byproducts using an electrostatic precipitator includes separating sulfur and silica compounds from ground-down bottom ash and fly ash. In these and other embodiments, the following CCPs are separated from the coal combustion byproducts: fly ash, bottom ash, scrubber materials, and raw coal. In some such embodiments, the scrubber materials include calcium sulfite and calcium sulfate and/or the bottom ash contains pyrites.

In some embodiments, the disclosed methods involve obtaining dry bottom furnace slag (DBFS) containing pyrites, removing moisture from the DBFS to achieve a moisture content of less than 10%, and grinding the DBFS to form a ground DBFS having a maximum particle size of 40 microns. In some such embodiments, the ground DBFS may have a mean particle size of between 10 and 25 microns. In these and other embodiments, the methods may also include incorporating the ground DBFS into a cementitious body. The cementitious body may include Ordinary Portland Cement and/or Pozzolanic Portland Cement. In these and other embodiments, between 20% and 30% ground DBFS by weight can be incorporated into the cementitious body.

Figure 1:
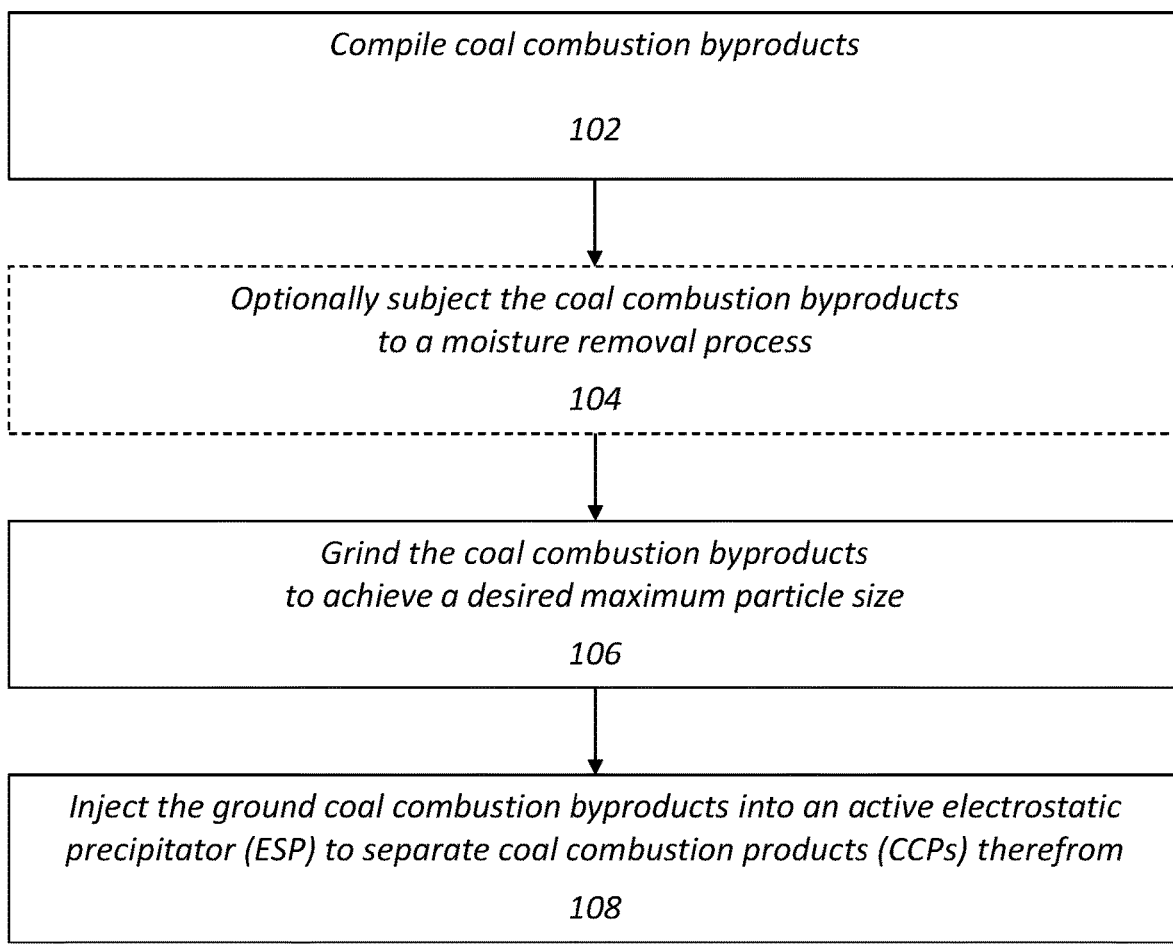
FIG. 1 illustrates an exemplary method of recovering coal combustion products (CCPs) from coal combustion byproducts, in accordance with some embodiments of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

The present disclosure involves methods of recovering coal combustion products (CCPs) and/or dry bottom furnace slag (DBFS) from coal combustion byproducts. For instance, the disclosed methods include separating CCPs from wastes produced from the combustion of lignite coal and/or bituminous coal. As will be appreciated by those skilled in the art upon consideration of the subject disclosure, processes to recover and use many or all of the CCPs derived from various types of coal waste (e.g., lignite and/or bituminous) will be extremely helpful to minimizing landfill waste and providing useful pozzolans for use in new products. The disclosed methods are described in more detail in the following paragraphs but, in general terms, the disclosed methods involve separation of the scrubber materials from the pozzolanic materials in the coal combustion byproducts, physically changing any large particles present to provide reactive pozzolans, and/or grinding any pyrites present to promote oxidation so that all of these products can be utilized efficiently.

FIG. 1 illustrates an exemplary method of recovering coal combustion products (CCPs) from coal combustion byproducts, in accordance with some embodiments of the present disclosure. The process flow of FIG. 1 may be used to process coal combustion byproducts from coal-burning facilities and/or landfills for coal-burning facilities. The method illustrated in FIG. 1 may be used to process any suitable type of coal combustion byproducts, including waste products generated from burning lignite coal, bituminous coal, and/or other types of coal. CCPs recovered in this manner may be suitable for use, for example, as cement additives.

Method 100 shown in FIG. 1 begins with compiling coal combustion byproducts (Block 102). The coal combustion byproducts may be recovered from a landfill or other storage site. In some embodiments, the coal combustion byproducts are removed from waste generated, at least in part, from the combustion of lignite coal and/or bituminous coal. The coal combustion byproducts may be recovered using any suitable technique, including with a backhoe, dragline, and/or front-end loader.

After compiling or obtaining the coal combustion byproducts, the coal combustion byproducts may optionally be subjected to a moisture removal process (Block 104). In some embodiments, the coal combustion byproducts may be processed to have a moisture content of less than 20%, such as less than 15%, or less than 10%. In select embodiments, the coal combustion byproducts may have a moisture content that is between 5% and 15%, such as approximately 10%.

Method 100 of FIG. 1 continues with grinding the coal combustion byproducts to achieve a desired maximum particle size (Block 106). In some embodiments, a coal pulverizer or similar device with or without an air separator may be used to grind the coal combustion byproducts. In some embodiments, a crushing device may grind the coal combustion byproducts into fine particles, such as particles having a maximum particle size of 50 microns, 45 microns, 40 microns, 35 microns, 30 microns, or less. In some such embodiments, the fly ash (which already has a small particle size) may flow through the crushing device used to grind the coal combustion byproducts without needing to be crushed into even smaller particles. Thus, in method 100 some or all coal combustion byproducts may be ground to a smaller particle size.

Grinding the coal combustion byproducts to ensure a relatively small maximum particle size may have numerous advantages. For example, calcium sulfite/calcium sulfate generated from a lignite plant and/or bituminous plant and stored in a landfill usually has a particle size of about 5-90 microns, with an average aggregate particle size (D90) of about 40 microns. Grinding the calcium sulfite/calcium sulfate to have a maximum particle size of 40 microns will grind the "soft" calcium sulfite/calcium sulfate preferentially as compared to the amorphous glass (hi-silica) materials found in fly ash and bottom ash. Also, after grinding, the pyrites mixed in with the coal combustion byproducts will have a much higher surface area and will oxidize to form iron sulfates, thereby eliminating any staining issues if the resulting product is used in a water-based cement system.

All these materials, once ground down, then can be injected at controlled rates back into the active electrostatic precipitator (ESP) to separate CCPs from the ground coal combustion byproducts (Block 108). ESP devices are generally known and can be found in use at various power stations. When the mixture is injected, the sulfur compounds will be smaller and lighter than the silica compounds (electronegatively, they are also different from the metals in the ash compounds). Thus, in the ESP, the sulfur and silica compounds will separate out from the ground-down bottom ash and fly ash compounds. In most ESPs, the first rows collect about 80% of the total ash, leaving about 20% for the next rows to handle. The electrostatic charge is increased in the second rows, tertiary rows, and/or final rows to ensure small particles are captured and not allowed to exit the flue gas stream out of the stack.

By physics, the smaller particles (which have higher velocities) are differentially captured in the ESP at different locations. For example, measuring the amount (load of particles captured) at different locations in an ESP, the center front row hoppers tend to catch the bulk of the particles. In large precipitations, (as seen with lignite coal plant combustion byproducts and/or bituminous coal plant combustion byproducts), there are usually up to 20 collection rods—with hoppers under each electrified rod collecting the airborne material—in just the front row of the ESP. Each precipitator is usually four rows deep (for lignite coal precipitators).

Sulfur compounds present in the coal combustion byproducts can aid the collection process. Specifically, the sulfur compounds will tend to differentiate from the other metals found in ash, allowing the sulfur compounds to be separated from the metal-containing pozzolans.

It will be appreciated by those skilled in the at that mills/pulverizers (e.g., Raymond® bowl mill, ball mill, etc.) at power stations can be converted (using existing coal pulverizers) to grind the bottom ash and/or other CCPs. However, in other embodiments, different grinding systems could be used to process the material before the ground materials are injected into either (A) the boiler gas, which is exiting from the boiler (laden with ash particles already) and then fed to the ESP bearing pozzolanic materials, or (B) the entrance to the ESP. Numerous configurations and variations are possible and contemplated herein.

Method 100 of FIG. 1 can, in some embodiments, separate the following CCP compounds from lignite coal and/or bituminous coal waste: fly ash, bottom ash (with or without pyrites present), scrubber materials (calcium sulfite and/or calcium sulfate, otherwise referred to as 'sulfur-containing compounds'), and/or raw coal. After separation using the ESP (as described in method 100) in which the ground-down gas-contaminated sulfur-containing compounds (gas scrubbing materials) are separated from the ground-down pozzolanic-containing metal compounds (fly ash and bottom ash), the separated compounds may be used individually or be recombined, if desired. In effect, using the disclosed methods to separate the dried, ground-down bottom ash from the neutralized pyrites and the high sulfur-containing scrubber material can allow each of these products to be utilized in different markets, thus, reclaiming vast landfill space, all while using currently available power station equipment.

It should also be appreciated that by grinding the pyrites mixed in with the coal combustion byproducts, the pyrites advantageously oxidize to non-deleterious compounds. As previously explained, before the filing of the subject application, bottom ash or DBFS-containing pyrites was not used as aggregate since the pyrites would cause undesirable qualities in the resulting products. Removal of pyrites from the bottom ash was expensive and unfeasible. However, as described below, the present methods advantageously provide a material that may safely be used as aggregate without needing to remove pyrites. Moreover, the presently disclosed materials can, in some cases, exhibit reactivity and function as pozzolans.

As will be appreciated, bottom ash (at times also referred to as "dry bottom furnace slag" or "DBFS") has been used as an aggregate in some types of products. As used herein, the term "bottom ash" is considered to be synonymous and interchangeable with the term "DBFS." Bottom ash that has been processed to remove pyrites has previously been used as a lightweight aggregate for products such as lightweight concrete blocks and lightweight concrete and other similar products. If the bottom ash is contaminated with pyrites, which is typically how a Coal Fired Power Station disposes of bottom ash, the bottom ash can only be used as an additive for the manufacture of Ordinary Portland Cement (OPC) in a Wet Process system. If a cement manufacturer uses a dry system (it should be noted that almost 100% of OPC producers are now dry), there is no good way to utilize bottom ash/DBFS in the manufacture of OPC. However, the subject application describes methods in which both new and previously landfilled bottom ash/DBFS can be processed to produce reactive minerals (also referred to herein as "pozzolans") and/or aggregate that can be used for other applications.

Figure 2:
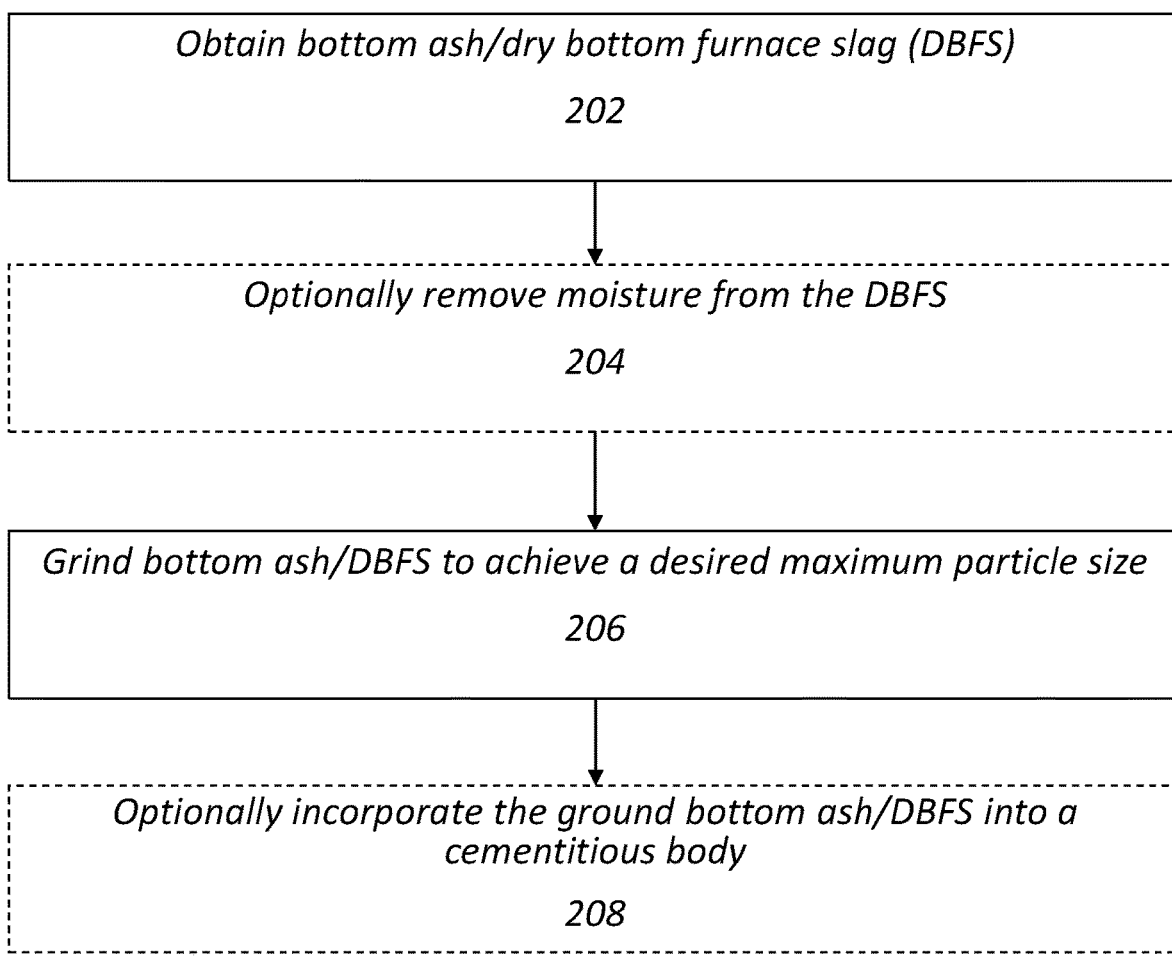
FIG. 2 illustrates an exemplary method of processing bottom ash/dry bottom furnace slag (DBFS), in accordance with some embodiments of the present disclosure.

FIG. 2 illustrates an exemplary method of processing bottom ash/dry bottom furnace slag (DBFS), in accordance with some embodiments of the present disclosure. Such processed DBFS may be suitable for use, for example, as a cement additive.

Method 200 shown in FIG. 2 begins with obtaining bottom ash/DBFS (Block 202). The bottom ash/DBFS can be obtained using the techniques previously set forth herein and described with respect to method 100 or other suitable techniques may be used. The bottom ash/DBFS obtained may be newly generated or recovered from a landfill. If appropriate, the bottom ash/DBFS may be processed to lower the total moisture content to less than 10% (Block 204). In some embodiments, the bottom ash/DBFS may contain pyrite (iron disulfide) and, in select embodiments, the bottom ash/DBFS contains between 0.5% and 10%, 2% and 8%, or 3% and 5% pyrite.

Method 200 of FIG. 2 continues with grinding the bottom ash/DBFS to achieve a desired maximum particle size (Block 206). In some embodiments, the bottom ash/DBFS may be ground using a ball mill, pulverizer, or any other type of suitable milling system. The bottom ash/DBFS may be ground until 100% of the material is able to pass through a 325 mesh screen (meaning that the maximum particle size is approximately 40 microns). In these and other embodiments, the ground bottom ash/DBFS may have a mean particle size of between 10 and 25 microns. Method 200 of FIG. 2 continues with optionally incorporating the ground bottom ash/DBFS into a cementitious body (Block 208). The cementitious body may, in some embodiments, include Ordinary Portland Cement (OPC) and/or Pozzolanic Portland Cement (PPC), as desired. In some embodiments, the cementitious body may include between 5%-50%, 10%-40%, 15%-35%, or between 20%-30% ground bottom ash/DBFS.

It has surprisingly been discovered that by grinding the bottom ash/DBFS to a small size (as described in method 200), the resulting material can be used for lightweight aggregate applications, such as forming cementitious bodies—even without removing the pyrites present. Specifically, it has been found that cementitious bodies produced using the presently disclosed methods can contain an appreciable amount of bottom ash/DBFS containing pyrite without exhibiting staining from the ferrous compounds present. Moreover, it has surprisingly been discovered that the ground bottom ash/DBFS can exhibit mineral reactivity (i.e., pozzolanic activity). In some embodiments, the ground (and/or melted) bottom ash/DBFS contains numerous minerals, such as amorphous silica, iron, and/or aluminum. It has been discovered that these materials within the bottom ash/DBFS can function as pozzolans. Thus, in some embodiments, the presently disclosed methods involve using ground dry bottom ash/DBFS (as described herein) as a pozzolan either on its own or with fly ash. Strength data (e.g., obtained according to ASTM C618/989) for ground bottom ash/DBFS supports the ability of these materials to function as pozzolans on their own or when blended with fly ash. As will be appreciated by those skilled in the art, reducing the amount of water in these materials can be used to increase the material's pozzolan reactivity.

Without wishing to be bound by theory, it is believed that when the pyrites present in the bottom ash/DBFS are ground down, the exposed surface area of the iron disulfide material is fully or partially oxidized to form iron sulfates. When incorporated into a cementitious body, these sulfates are consumed in the cementitious reaction. The presently disclosed methods thus advantageously allow previously unusable components (bottom ash containing pyrites) to be used as aggregate with only minimal processing. These methods are therefore believed to be quite important to reducing landfill waste as well as providing relatively inexpensive and high-quality aggregate.

Furthermore, it has been observed that bottom ash/DBFS that is ground down in accordance with method 200 as previously described herein typically contains between 45%-75% amorphous glass (as determined by X-ray powder diffraction) and is activated enough that the material will pass ASTM 618 testing as a fly ash material. Thus, millions of tons of disposed bottom ash/DBFS can be reclaimed using the disclosed methods and new bottom ash/DBFS can be efficiently processed.

It is believed that bottom ash/DBFS from CFPP that was derived from a non-Powder River Basin (non-PRB) coal will exhibit properties similar to that of a class F fly ash and will help concrete to withstand alkali-silica reaction (ASR) and other concrete quality issues. Bottom ash derived from PRB coal, while chemically higher in calcium (PRB-derived DBFS typically contains between 14%-30% calcium, while non-PRB-derived DBFS typically contains 3%-10% calcium), is still stable in a concrete mix and both can be used as a reactive pozzolan to contribute to the strength properties seen as a pozzolan while not causing strength losses.

Due to clean air regulations, most CFPPs converted to PRB coal. That means ESPs designed to capture 1-2 million tons of fly ash only have to capture about 20% of that load now (because of the low ash content of PRB coal). Thus, the capacity to inject this new material and have it collected and separated has a lot of capacity (for example, to inject 800-1.2 million tons/yr. into an existing ESP) and clean out the sulfur materials for sale separately from the pozzolans (fly ash as produced, usually Class C), reclaimed and dried Class F pozzolans, and new pozzolans created from bottom ash being ground down to Class F base. Some of the sulfur compounds can be used in the new pozzolans created, but most can be sold for other processes. Numerous configurations and variations are contemplated and will be apparent to one skilled in the upon consideration of the subject disclosure.

The invention claimed is:

1. A method of recovering coal combustion products (CCPs) from coal combustion byproducts, the method comprising:
   compiling coal combustion byproducts;
   grinding the coal combustion byproducts to form ground coal combustion byproducts with a maximum particle size of 40 microns; and
   separating the CCPs from the ground coal combustion byproducts using an electrostatic precipitator.

2. The method of claim 1, wherein the coal combustion byproducts include at least one of: calcium sulfite, calcium sulfate, and pyrites.

3. The method of claim 1, wherein the coal combustion byproducts are derived from combustion of at least one of lignite coal and bituminous coal.

4. The method of claim 1, further comprising:
   removing moisture from the coal combustion byproducts to achieve a moisture content of between 5% and 15%.

5. The method of claim 1, wherein separating the CCPs from the ground coal combustion byproducts using the electrostatic precipitator includes separating sulfur and silica compounds from ground-down bottom ash and fly ash.

6. The method of claim 1, wherein the CCPs separated from the coal combustion byproducts include at least one of: fly ash, bottom ash, scrubber materials, and raw coal.

7. The method of claim 6, wherein the scrubber materials include at least one of calcium sulfite and calcium sulfate.

8. The method of claim 6, wherein the bottom ash contains pyrites.

9. The method of claim 1, wherein grinding the coal combustion byproducts to form ground coal combustion byproducts involves use of at least one of a mill and a pulverizer.

10. The method of claim 1, further comprising:
    recombining at least two different types of the CCPs.

11. The method of claim 8, wherein the bottom ash contains between 0.5-10 wt % pyrites.

12. A method comprising:
    obtaining dry bottom furnace slag (DBFS) containing pyrites;
    removing moisture from the DBFS to achieve a moisture content of less than 10%; and
    grinding the DBFS to form a ground DBFS having a maximum particle size of 40 microns.

13. The method of claim 12, wherein the ground DBFS has a mean particle size of between 10 and 25 microns.

14. The method of claim 12, further comprising:
    incorporating the ground DBFS into a cementitious body.

15. The method of claim 14, wherein the cementitious body includes at least one of Ordinary Portland Cement and Pozzolanic Portland Cement.

16. The method of claim 14, wherein the cementitious body includes between 20% and 30% ground DBFS.

17. The method of claim 12, wherein the DBFS contains between 0.5-10 wt % pyrites.

18. The method of claim 12, wherein the ground DBFS contains between 45-75 wt % amorphous glass.

19. The method of claim 12, wherein grinding the DBFS to form the ground DBFS involves use of at least one of a mill and a pulverizer.

20. The method of claim 12, further comprising:
    mixing the ground DBFS with fly ash.

* * * * *